(12) United States Patent
Sasse

(10) Patent No.: US 6,715,777 B2
(45) Date of Patent: Apr. 6, 2004

(54) WHEEL SUSPENSION FOR LAND VEHICLES

(75) Inventor: Thomas Sasse, Ennepetal (DE)

(73) Assignee: Krupp Bilstein GmbH, Ennepetal (DE)

( * ) Notice: Subject to any disclaimer, the term of this patent is extended or adjusted under 35 U.S.C. 154(b) by 39 days.

(21) Appl. No.: 10/135,268

(22) Filed: Apr. 29, 2002

(65) Prior Publication Data
US 2002/0163156 A1 Nov. 7, 2002

(30) Foreign Application Priority Data
May 3, 2001 (DE) .......................... 101 21 537

(51) Int. Cl.⁷ .............................................. B60G 15/07
(52) U.S. Cl. ...................... 280/124.154; 280/124.107; 267/218
(58) Field of Search ................ 280/124.145, 124.146, 280/124.147, 124.154, 124.155, 124.107; 267/221, 218, 188; 188/322.19

(56) References Cited

U.S. PATENT DOCUMENTS 3,951,391 A * 4/1976 Papousek .................... 267/218
5,326,084 A * 7/1994 Mevissen et al. ........... 267/221
2002/0135213 A1 * 9/2002 Fullenkamp et al. ....... 297/311

FOREIGN PATENT DOCUMENTS

| DE | 4438756 A1 | * | 6/1995 | ........... B60G/15/06 |
| JP | 08108721 A | * | 4/1996 | ........... B60G/17/00 |
| JP | 2000103215 A | * | 4/2000 | ........... B60G/15/06 |

* cited by examiner

Primary Examiner—Peter C. English
(74) Attorney, Agent, or Firm—Max Fogiel

(57) ABSTRACT

A wheel suspension for land vehicles that is provided with a spring resting against at least one seat, with a dashpot, and with an attachment for a stabilizing rod, whereby one seat can be adjusted axially parallel to the spring. The object of the invention is to allow the stabilizing rod's attachment to be situated in the vicinity of the seat. An attachment (10 or 20) for the stabilizing rod is accordingly directly mounted on or indirectly attached to the spring seat (8). The attachment can also be mounted on or attached to the mechanism that adjusts it, at a variable distance from the seat.

7 Claims, 2 Drawing Sheets

WHEEL SUSPENSION FOR LAND VEHICLES

BACKGROUND OF THE INVENTION

The present invention concerns a wheel suspension for land vehicles that is provided with a spring resting against at least one seat.

Some automobiles are manufactured in very limited quantities. Some are employed in rallies and accordingly require very precise adjustment of the suspension-spring to shock-absorber ratio. For these applications, adjustable spring seats are known. The seat is adjusted by way of inside threads that engage outside threads, or of annular ridges that fit into matching annular grooves, on the supporting component. Generally, the seat rests against the outer cylinder of a dashpot or telescoping leg. This approach to installing an adjustable spring seat is known from German Publication No. 4 438 756 A1.

German Publication No. 4 201 837 C1 discloses attaching a stabilizing rod directly to a spring seat welded rigidly to the outer cylinder of a dashpot.

If the means of attachment disclosed in German Publication No. 4 201 837 C1 were employed with an adjustable spring seat like the one disclosed in German Publication No. 4 438 756 A1, the tension on the stabilizing rod would necessarily vary with the setting of the seat. This would be a drawback in that the overall operation dynamics could not be controlled as desired.

SUMMARY OF THE INVENTION

The object of the present invention is an improved wheel suspension for land vehicles that is provided with a spring resting against at least one seat wherein the stabilizing rod's attachment can be situated in the vicinity of the seat.

The present invention has several advantages. It allows a stabilizing rod to be attached in the vicinity of the spring seat in a wheel suspension that uses an adjustable seat. Furthermore, not only the spring but also the stabilizing rod can be fine adjusted to particular situations, allowing a variability that will ensure optimal driving conditions.

BRIEF DESCRIPTION OF THE DRAWINGS

One embodiment of the present invention will now be specified with reference to accompanying drawing, wherein.

DESCRIPTION OF THE PREFERRED EMBODIMENTS

Figure 1:
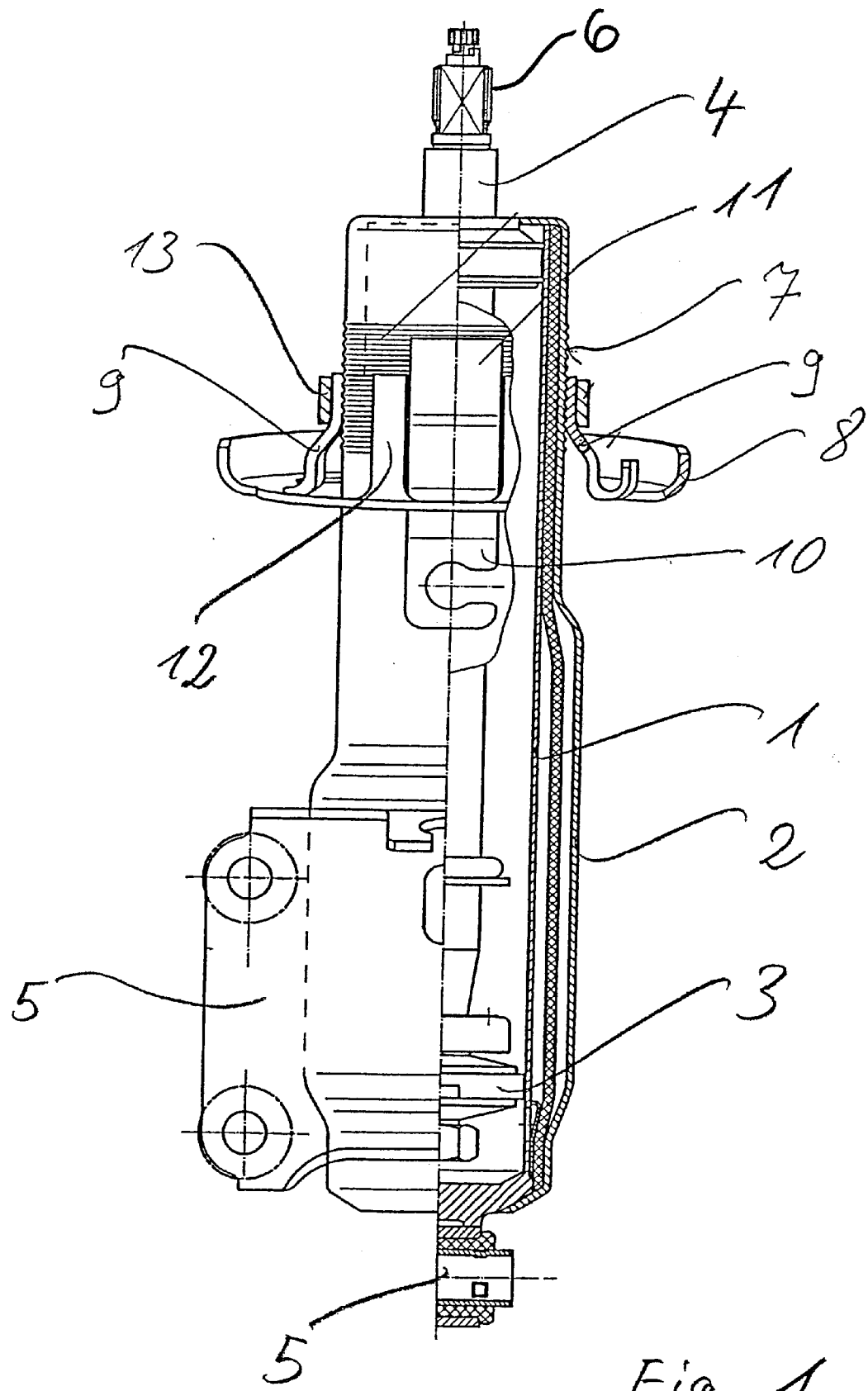
FIG. 1 is a semisection through a telescoping leg and FIG. 2 is an exploded view of a spring seat that can be tightened in place.

The telescoping leg illustrated in FIG. 1 comprises an inner cylinder 1 and an outer cylinder 2. A piston 3 travels up and down inside inner cylinder 1 on the end of a piston rod 4. The other end of piston rod 4 is attached to the vehicle's body. The telescoping leg is provided with receiving elements 5 and 6 for the wheel suspension.

The piston-rod end of outer cylinder 2 is provided with annular grooves 7 that extend around it. The inner surface of a spring seat 8 is provided with tongue-like tabs 9 that are in turn provided with ridges. An attachment 10 for a stabilizing rod is provided with a finger-like connector 11 that extends by way of a cutout through another tab 12 and through spring seat 8. Connector 11 is, like tabs 9 and 12, provided with ridges. All of these ridges can be in the form of segments of a ring.

Attachment 10 and spring seat 8 can be adjusted independent of each other by individual axial displacement and accordingly adapted to the requirements of the specific wheel suspension. Once this adjustment has been established, a retaining ring 13 is positioned around the tabs 9 and 12 on spring seat 8, and the connector 11 on attachment 10, thereby securing the positions of the seat and attachment. Since connector 11 is longer than tabs 9 and 12, retaining ring 13 will enclose connector 11 in all relative positions.

Figure 2:
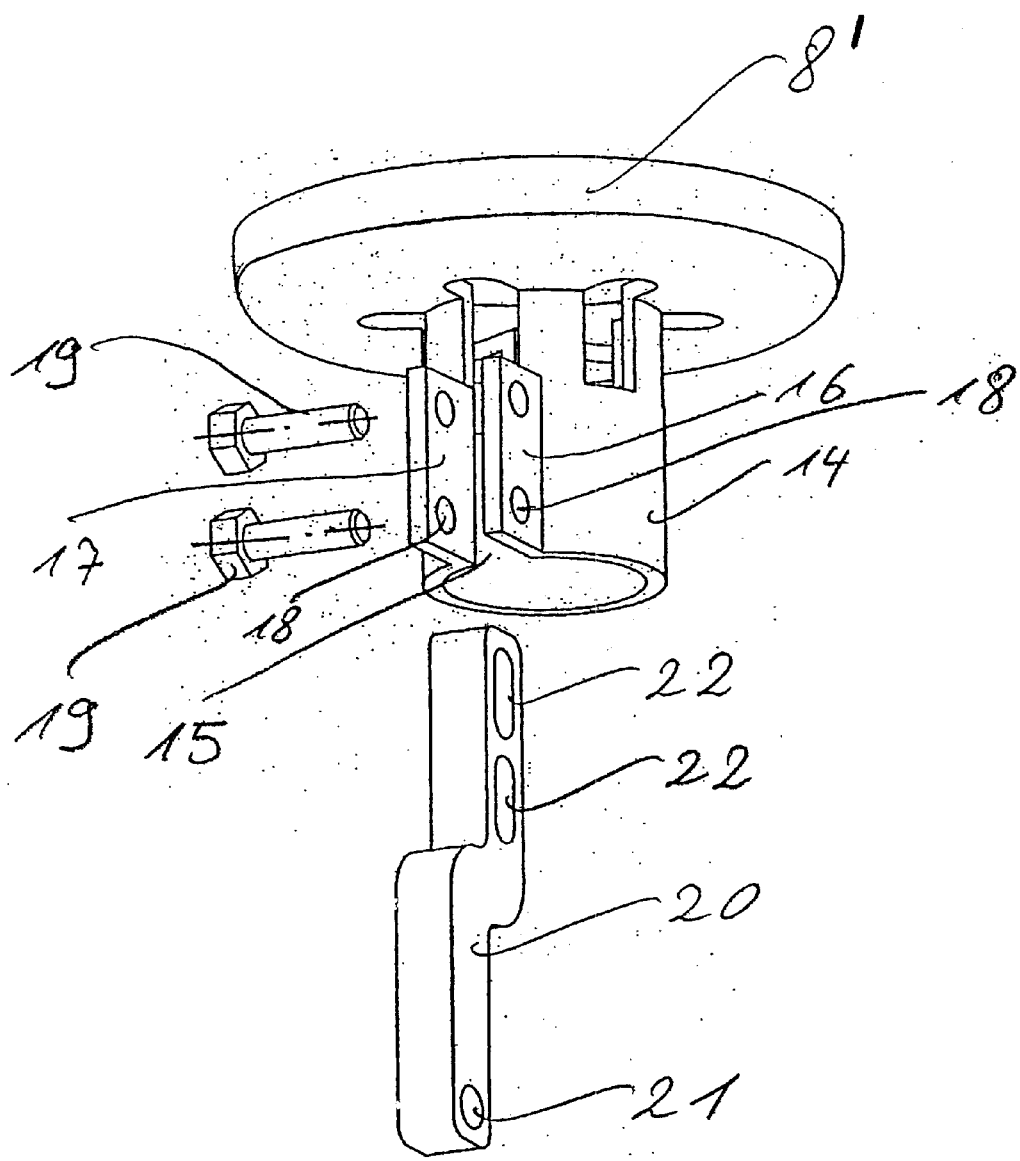

FIG. 2 illustrates another approach to attaching an adjustable spring seat. The spring seat 8' in this embodiment is provided with a tightening collar 14. Collar 14 itself is provided with a longitudinal slit 15 and with axial flanges 16 and 17. Flanges 16 and 17 extend radially out on each side of slit 15 and are penetrated by bores 18. Collar 14 can be tightened around the outer cylinder 2 of a dashpot or telescoping leg by means of threaded fasteners that comprise screws 19 and unillustrated nuts for example. Additional security can be provided by grooves and ridges as in the embodiment illustrated in FIG. 1.

The stabilizing-rod attachment 20 for the spring seat 8' illustrated in FIG. 2 is a flat dogleg with a rod-accommodating bore 21 through the end remote from the seat. The end of attachment 20 near the seat is provided with slots 22 that accommodate screws 19, allowing independent adjustment of attachment 20 in relation to seat 8'. Screwing the threaded fasteners together will secure the position of seat 8' on outer cylinder 2 and the position of attachment 20 relative to the seat. Any excess tension can be compensated with cup springs or cogged washers.

List of Parts 1. inner cylinder
2. outer cylinder
3. piston
4. piston rod
5. receiving element 5
6. receiving element 6
7. groove
8. spring seat
9. tab
10. attachment
11. connector
12. tab
13. retaining ring
14. collar
15. slit
16. flange
17. flange
18. bore
19. screws
20. attachment
21. bore
22. slot

What is claimed is:

1. A wheel suspension for land vehicles comprising: a spring resting against at least one spring seat; a dashpot; an attachment for a stabilizing rod; said one seat being adjustable axially relative to said spring; said attachment for said stabilizing rod being mounted on said spring seat; said dashpot having an outer cylinder attached to said spring seat, said spring seat being adjustable in an axial direction relative to said outer cylinder and being fixable in place after an adjustment of said spring seat; said attachment for said stabilizer rod being adjustable relative to said outer cylinder independent of said spring seat.

2. The wheel suspension as defined in claim 1, said spring seat being attached to and adjustable relative to said outer cylinder of said dashpot.

3. The wheel suspension as defined in claim 2, including a fastening collar on said spring seat, said for said stabilizing rod having an upper portion and a lower portion, said attachment being positioned along said outer cylinder with said upper portion adjacent said collar and said lower portion below said collar.

4. The wheel suspension as defined in claim 2, including a fastening collar on said spring seat and having at least one longitudinal slit extending along axial flanges penetrated by tensioning means, in the form of threaded fasteners tightening said collar around the outer cylinder, said fasteners supporting said attachment for the stabilizing rod.

5. The wheel suspension as defined in claim 1, characterized in that the outer cylinder of the dashpot is provided with annular grooves whereby a fastening tab on the spring seat (8) and a contact surface of the attachment (10) for the stabilizing rod are both provided with matching ridges, and are thereby secured adjustably to the outer cylinder.

6. The wheel suspension as defined in claim 1, wherein said attachment for said stabilizing rod is positioned radially inside a cutout formed in said spring seat.

7. The wheel suspension as defined in claim 1, wherein a fastening tab on said spring seat and a contact surface of said attachment for the stabilizing rod are surrounded by a retaining ring.

\* \* \* \* \*